United States Patent
Berroth et al.

(10) Patent No.: US 7,688,011 B2
(45) Date of Patent: Mar. 30, 2010

(54) CONTROL CIRCUIT FOR AN ELECTRONICALLY COMMUTATED MOTOR

(75) Inventors: Hansjörg Berroth, VS-Obereschach (DE); Frank Jeske, St. Georgen (DE); Volker Mauch, Dunningen (DE); Arnold Kuner, St. Georgen (DE)

(73) Assignee: EBM-PAPST St. Georgen GmbH & Co. KG, St. Georgen (DE)

( * ) Notice: Subject to any disclaimer, the term of this patent is extended or adjusted under 35 U.S.C. 154(b) by 111 days.

(21) Appl. No.: 11/814,172

(22) PCT Filed: Jan. 17, 2006

(86) PCT No.: PCT/EP2006/000353

§ 371 (c)(1), (2), (4) Date: Aug. 28, 2007

(87) PCT Pub. No.: WO2006/077069

PCT Pub. Date: Jul. 27, 2006

(65) Prior Publication Data

US 2008/0297084 A1    Dec. 4, 2008

(30) Foreign Application Priority Data

Jan. 20, 2005    (DE) .................. 10 2005 004 067

(51) Int. Cl.
*H02P 1/00*    (2006.01)

(52) U.S. Cl. .................. 318/293; 318/292; 318/294
(58) Field of Classification Search .............. 318/293, 318/292, 294, 285, 138, 280, 599, 603, 400.22, 318/434; 388/811

See application file for complete search history.

(56) References Cited

U.S. PATENT DOCUMENTS

| | | | |
|---|---|---|---|
| 6,288,507 B1 | 9/2001 | Makino et al. | 318/293 |
| 6,321,167 B1 * | 11/2001 | Jochi et al. | 702/60 |
| 6,930,584 B2 | 8/2005 | Edo et al. | 336/200 |
| 6,995,534 B2 | 2/2006 | Berroth et al. | 318/434 |

* cited by examiner

*Primary Examiner*—Karen Masih
(74) *Attorney, Agent, or Firm*—Milton Oliver, Esq.; Oliver Intellectual Property LLC (57) ABSTRACT

A control circuit for an electronically commutated motor (120), having a power stage (122) that comprises at least two semiconductor switches (216, 218) to influence the motor current. The semiconductor switches are controllable by way of commutation signals. The control circuit comprises a current measuring element (170) to make available a motor current control variable (I) dependent on the motor current, a base diode (240) that is arranged in series with the current measuring element and between the current measuring element and the at least two semiconductor switches, and a motor current setting element (180) with which the commutation signals can be influenced as a function of the motor current control variable.

23 Claims, 4 Drawing Sheets

CONTROL CIRCUIT FOR AN ELECTRONICALLY COMMUTATED MOTOR

CROSS-REFERENCE

This application is a section 371 of PCT/EP06/00353, filed 17 Jan. 2006, published 17 Jul. 2006 as WO 2006-077 069-A1.

FIELD OF THE INVENTION

The invention relates to a control circuit for an electronically commutated motor, which motor is usable in particular for driving small fans.

BACKGROUND

Electronically commutated motors (ECMs) having two-strand driver circuits with no current limitation, which motors have a predetermined power density, are often used to drive small fans. An increase in the power density of an ECM is usually achieved by improving efficiency. The better the efficiency, the lower the resistance that can, as a rule, be selected for the motor winding of the ECM. The result, however, is that the starting and stalling current of the ECM is many times greater than the average value of the operating current. To prevent overloading of the ECM in this context, corresponding current limiting actions must be taken when the power density of an ECM is raised.

The application of usual current limiting actions to two-strand fan motors requires, however, the use of an electrolytic capacitor in the link circuit, which capacitor ensures, in ON-OFF operation, that the voltage at the link circuit is kept within tolerable limits by the recovery currents in the power stage. Electrolytic capacitors generally have only a limited service life, however, and in the required capacitance range are physically difficult to accommodate. In addition, electrolytic capacitors in the required dimensional range are obtainable exclusively in wire-connected form and—when circuit boards having fully surface-mounted devices (SMDs) are used—cannot be placed onto the boards using the reflow soldering process.

SUMMARY OF THE INVENTION

It is an object of the present invention to make available a novel control circuit for an ECM that is usable as the drive system of a small fan. This object is achieved by a control circuit having a current measuring element, a base diode arranged in series between the current measuring element and semiconductor switches, and a motor current setting element with which commutation signals can be influenced as a function of motor current.

The invention is based on the recognition that current limitation for an ECM that is usable in particular to drive small fans can be achieved using a comparatively simple and inexpensive control circuit. This control circuit is, according to the present invention, interconnected with the power stage of the ECM, and preferably encompasses a current measuring element and a motor current setting element. The current measuring element makes available a motor current control variable dependent on the motor current. The motor current setting element influences, as a function of the motor current control variable, commutation signals to control the power stage. This allows the motor current to be limited, in particular upon startup and stalling of the ECM. The invention is not, however, limited to a specific type of motor.

A basic idea of the invention is that an appropriate layout of the power stage keeps voltage spikes in the link circuit, and resulting loads on the power stage and in terms of electromagnetic compatibility, within limits, and decreases possible excitation of unpleasant solid-borne sound. According to a preferred embodiment of the present invention, the control circuit encompasses for this purpose a base diode that is arranged in series with the current measuring element and between the current measuring element and at least two semiconductor switches of the power stage. Each semiconductor switch is connected to a pertinent stator winding of the ECM. When a first winding strand of the ECM is shut off very quickly via a corresponding shutoff signal, there is a sharp rise in the voltage in the strand and therefore, because of the energy still present in the strand, at the pertinent semiconductor switch. The voltage rise in the first winding strand generates, by way of the transformer coupling of the bifilar winding, an opposite voltage in a corresponding second winding strand. The opposite voltage produces a current flow through the internal recovery diodes that are associated with the at least two semiconductor switches, and into the link circuit. To prevent this current flow from causing excessive voltage spikes in the link circuit and an increased load on the semiconductor switches of the power stage, the base diode produces a slowed shutoff of the first semiconductor switch, which is therefore briefly held in the linear state even after reception of the shutoff signal. Voltage spikes in the link circuit, as well as the currents through the recovery diodes in the link circuit, are thereby greatly reduced.

As compared with known approaches, therefore, in an exemplifying embodiment the electrolytic capacitor otherwise required in the link circuit can be reduced to an SMD ceramic capacitor in the 100 nF range. According to a preferred embodiment of the present invention, this allows a control circuit to be implemented on a fully SMD circuit board that can be completely populated using the reflow soldering process.

According to further preferred embodiments of the present invention, the base diode is connected in such a way that no current can flow from ground GND into the DC link circuit. The at least two semiconductor switches of the power stage are furthermore preferably implemented as field-effect transistors, the source terminal being in each case connected to the base diode, and the drain terminal to a pertinent stator winding of the ECM. An R/C element is provided between the gate terminal and drain terminal of each of the at least two field-effect transistors. The R/C elements slow down the shutoff of the semiconductor switches and flatten out the steep switching edges of the shutoff signals.

BRIEF FIGURE DESCRIPTION

Further details and advantageous refinements of the invention are evident from the exemplifying embodiments that are described below and depicted in the drawings, in which.

DETAILED DESCRIPTION

Figure 1:
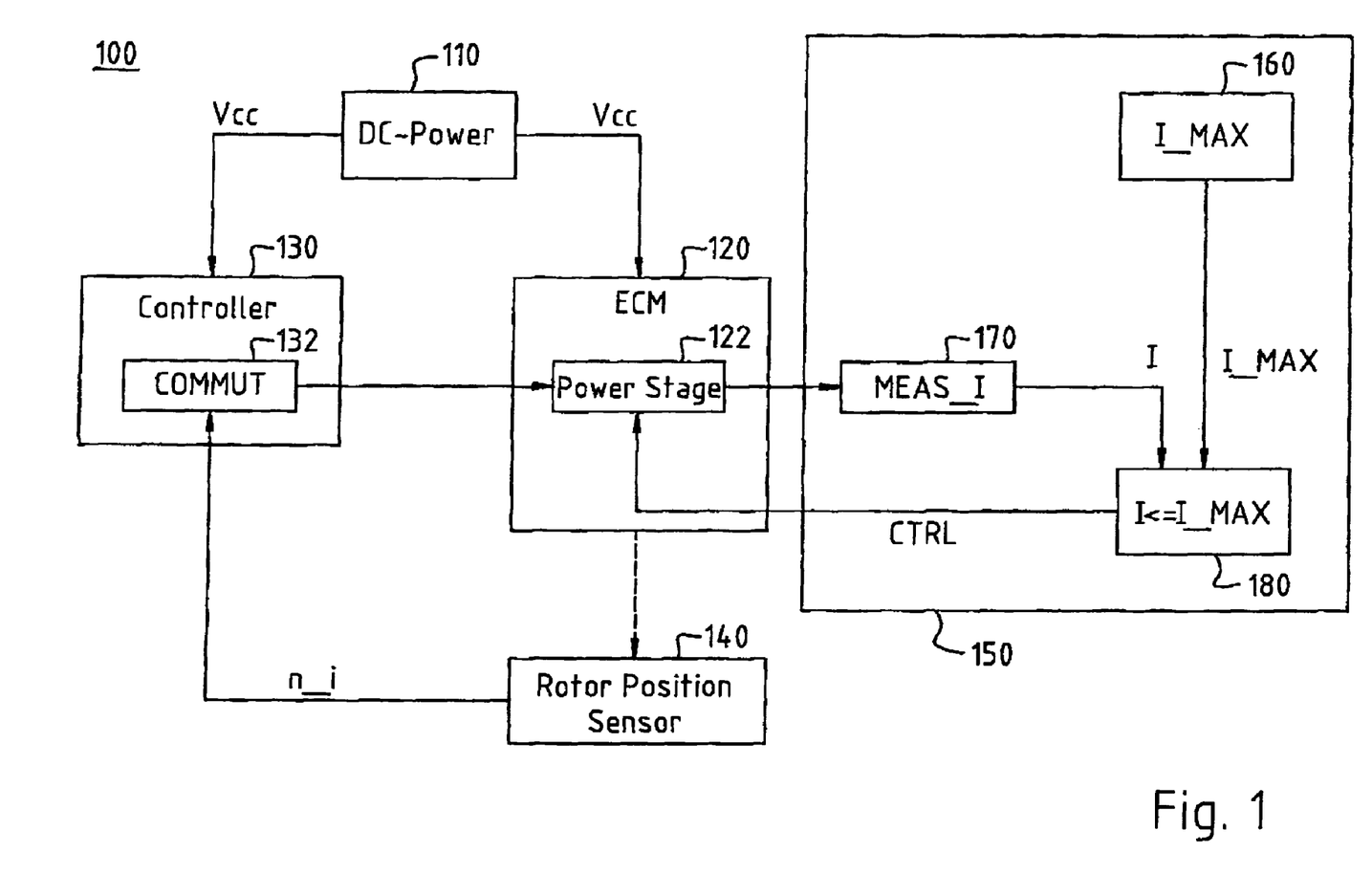
FIG. 1 is a block diagram of an apparatus having a control circuit for current limitation for an ECM (Electronically Commutated Motor), in accordance with the invention.

FIG. 1 is a block diagram illustrating the functional principle of an apparatus 100 for operating an ECM 120 in accordance with the present invention. Apparatus 100 according to the present invention is configured to limit the motor current of ECM 120 especially when ECM 120 is starting up and stalled. It is thereby possible to limit the occurrence of current spikes in the motor winding of ECM 120, and thus any overloading of individual components of apparatus 100.

In accordance with an embodiment of the present invention, apparatus 100 encompasses a DC voltage source 110 (DC-Power) that is connected to ECM 120 and to a controller 130. Controller 130 encompasses a commutation controller 132 (COMMUT) that is connected on the input side to at least one Hall sensor or rotor position sensor 140. The at least one Hall sensor 140 is associated with ECM 120. Commutation controller 132 generates commutation signals for a power stage 122 of ECM 120, as a function of Hall signals that are made available by the at least one Hall sensor 140. Power stage 122 is connected to a control circuit 150 for limiting the motor current of ECM 120. Control circuit 150 encompasses a current measuring element 170 (MEAS_I), a motor current limit value generator 160 (I_MAX), and a motor current setting element 180 (I<=I_MAX). According to the present invention, power stage 122 is connected on the output side, via current measuring element 170, to motor current setting element 180. Motor current setting element 180 is furthermore connected on the input side to motor current limit value generator 160. On the output side, motor current setting element 180 is coupled back to power stage 122 of ECM 120 in order to influence, as a function of a motor current control variable made available by current measuring element 170, the commutation signals made available by commutation controller 132.

During the operation of apparatus 100, DC voltage source 110 generates a supply voltage Vcc that is also referred to as operating voltage +U_B. Supply voltage Vcc is delivered on the one hand to ECM 120 and on the other hand to controller 130. ECM 120 converts supply voltage Vcc into rotations at a specific rotation speed. An actual rotation speed value can be determined by means of the at least one Hall sensor 140 associated with ECM 120. This is done preferably by generating, from the Hall signals of ECM 120, an analog rotation-speed-dependent signal n_i (actual rotation speed variable) that represents the actual rotation speed value of ECM 120. As a function of actual rotation speed variable n_i, commutation controller 132 generates the commutation signals for controlling power stage 122 of ECM 120.

In accordance with a preferred embodiment of the present invention, the commutation signals are influenced by motor current setting element 180 in order to limit the motor current of ECM 120. A motor current limit value I_MAX is delivered, for this purpose, from motor current limit value generator 160 to motor current setting element 180. Motor current limit value I_MAX is a changeable value that can be adjusted as a function of a corresponding configuration of apparatus 100. In addition, a motor current control variable I dependent on the motor current is delivered from current measuring element 170 to motor current setting element 180. Motor current setting element 180 compares motor current limit value I_MAX with motor current control variable I, or with a variable derived therefrom, and generates a control signal CTRL. Control signal CTRL is delivered to power stage 122 in order to influence, as a function of motor current control variable I, the commutation signals for controlling power stage 122.

The motor current of ECM 120 is thus, in accordance with the present invention, limited by influencing, as a function of a motor current control variable I derived dynamically from the motor current, the commutation signals for controlling power stage 122. In particular, in accordance with an embodiment of the invention, the motor current is dynamically limited for the case in which motor current control variable I exceeds motor current limit value I_MAX. Such exceedances occur, inter alia, when ECM 120 is starting up or stalled, as a result of high current values in the motor winding of ECM 120. The limiting of the motor current according to the present invention is thus suitable in particular for limiting the motor current when ECM 120 is starting up or stalled, in order to reduce the high current values that occur.

Figure 2:
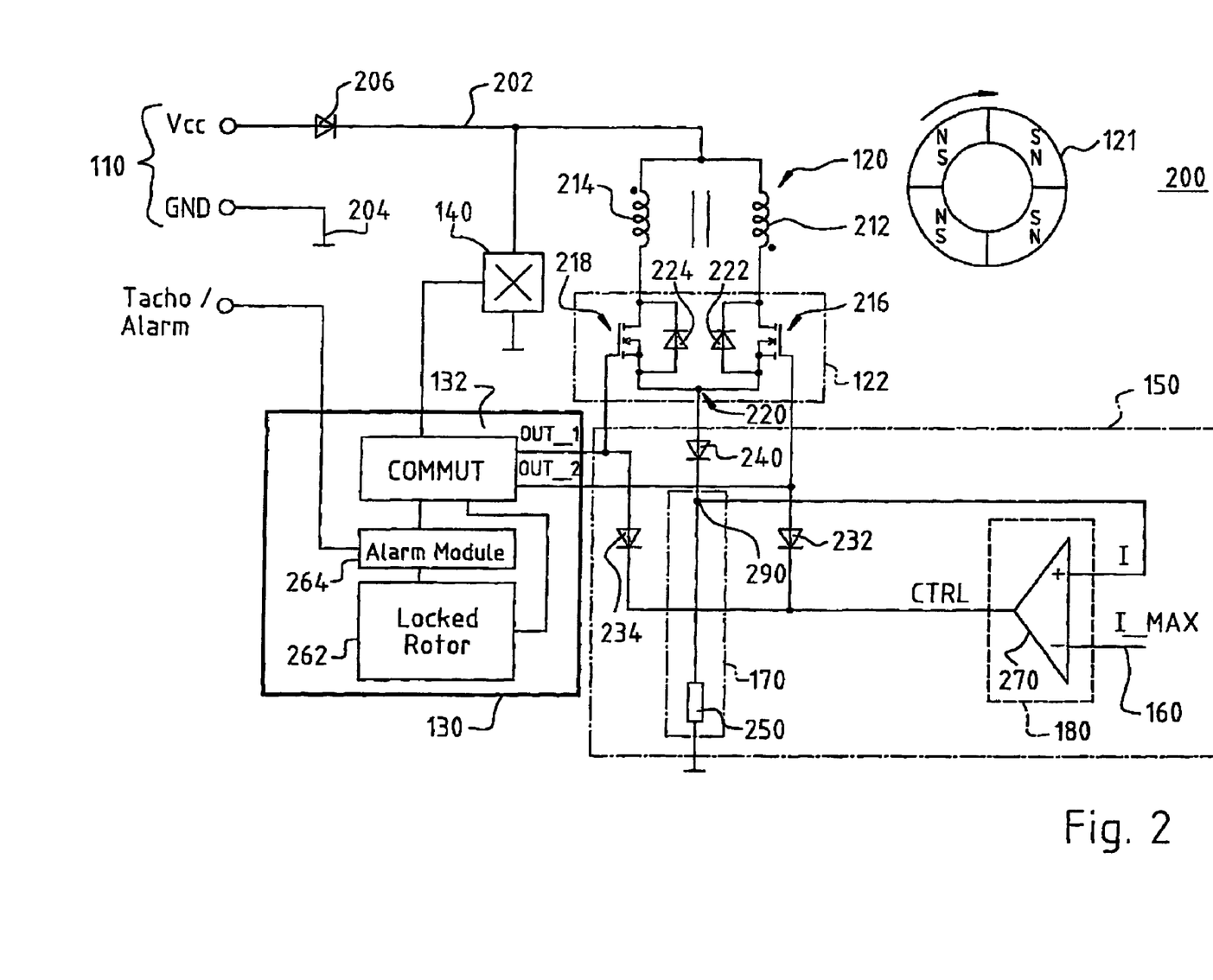
FIG. 2 is a simplified circuit diagram of an apparatus having a control circuit for current limitation for an ECM, in accordance with an embodiment of the invention.

FIG. 2 shows a simplified circuit diagram of an exemplifying circuit 200 with which apparatus 100 for operating ECM 120 of FIG. 1 is realized in accordance with a first embodiment. The exemplifying circuit 200 accordingly encompasses a plurality of components that make up DC voltage source 110; ECM 120 having power stage 122 and having the at least one associated Hall sensor 140; controller 130 having commutation controller 132; and control circuit 150 having motor current limit value generator 160, current measuring element 170, and motor current setting element 180.

In the exemplifying circuit 200, DC voltage source 110 encompasses a positive pole Vcc that is connected to a positive lead 202, and a negative pole GND that is connected to a negative lead 204. Positive pole Vcc is connected via positive lead 202 to the anode side of a rectifier diode 206. The cathode side of rectifier diode 206 is connected on the one hand via the at least one Hall sensor 140 to ground, and on the other hand to one end of each motor strand of ECM 120. ECM 120 is depicted, by way of example, as a two-strand DC motor having two motor strands 212 and 214. The cathode side of rectifier diode 206 is correspondingly connected to one end of motor strand 212 and to one end of motor strand 214. The other end of motor strand 212 is connected to a semiconductor switch 216 of power stage 122, and the other end of motor strand 214 is connected to a semiconductor switch 218 of power stage 122.

As illustrated in FIG. 2, in accordance with a preferred embodiment semiconductor switches 216 and 218 are implemented using field-effect transistors of the MOSFET type. Those ends of motor strands 212 and 214 that are connected to the semiconductor switches are attached respectively to the drain regions of the MOSFETs. The respective source regions of the MOSFETs are connected to one another via a base node 220. The source region of MOSFET 216 is connected to the anode side of a recovery diode 222, and the drain region of MOSFET 216 is connected to the cathode side of recovery diode 222. The source region of MOSFET 218 is connected to the anode side of a recovery diode 224, and the drain region of MOSFET 218 is connected to the cathode side of recovery diode 224. The gate of MOSFET 216 is furthermore connected on the one hand to commutation controller 132 and on the other hand to the anode side of a diode 232. The gate of MOSFET 218 is on the one hand also connected to commutation controller 132, and on the other hand connected to the anode side of a diode 234. The cathode sides of diodes 232 and 234 are connected to the output of an operational amplifier 270. Base node 220 is additionally connected to the anode side of a base diode 240. The cathode side of base diode 240 is connected, via a node 290, on the one hand via a shunt resistor 250 to ground, and on the other hand to the non-inverting input of operational amplifier 270. The inverting input of the operational amplifier is connected to motor current limit value generator 160, which according to the present invention is implemented using a reference voltage source.

Commutation controller 132 is connected on the input side to Hall sensor 140 and to a stall protection unit 262. On the output side, commutation controller 132 is connected on the one hand, as described above, to the gate regions of MOSFETs 216 and 218, and on the other hand to an alarm module 264. Alarm module 264 is connected to a tacho/alarm output at which a tacho and an alarm signal are made available. According to the present invention, stall protection unit 262 is configured to ascertain, via rotor position signals that can be derived from the Hall signals of ECM 120, whether ECM 120 is stalled. Alarm module 264 is configured to output an alarm signal when the rotor of ECM 120 is stationary or stalled, since in that case the MOSFETs or the motor winding can be thermally destroyed, or at least damaged, by heat buildup. Alarm module 264 is additionally configured to output a tacho signal that indicates the rotor position.

During the operation of apparatus 200, DC voltage source 110 makes a supply voltage Vcc available via positive lead 202. Supply voltage Vcc is preferably a substantially constant DC voltage that is generated by a power supply or a battery. Rectifier diode 206 constitutes a polarity protector for ECM 120. Rectifier diode 206 is therefore conductive only for a supply voltage Vcc of correct polarity, and negative voltage interference in supply voltage Vcc is blocked. ECM 120 converts supply voltage Vcc, using motor strands 212 and 214, into a rotation of a rotor 121, for example a permanent-magnet rotor. An actual rotation speed value of rotor 121 can be determined in this context by means of the at least one Hall sensor 140 that is associated with ECM 120. Corresponding Hall signals generated by the at least one Hall sensor 140 are delivered for this purpose to commutation controller 132.

Commutation controller 132 generates, as a function of the actual rotation speed value or a variable derived therefrom, commutation signals OUT_1 and OUT_2 to control power stage 122, which is implemented by way of example with MOSFETs 216 and 218. Commutation signals OUT_1 and OUT_2 are delivered to the gate regions of MOSFETs 216 and 218 in order to control, using MOSFETs 216 and 218, the currents flowing through motor strands 212 and 214 so as to generate an alternating magnetic field to drive the rotor. The motor currents can, in particular, be commutated in such a way that the rotor of ECM 120 rotates at a predetermined speed.

For commutation of the motor currents, MOSFETs 216 and 218 are switched on or off as necessary by corresponding commutation signals OUT_1 and OUT_2 respectively, with the result that motor strands 212 and 214 associated with the MOSFETs are likewise correspondingly activated or shut off. When motor strand 212, for example, is shut off very quickly via a corresponding shutoff signal, the voltage in motor strand 212 (and thus at the pertinent MOSFET 216) rises sharply as a result of the energy still present in motor strand 212. As a result of the voltage rise in motor strand 212, an opposite voltage is induced in motor strand 214 by way of the transformer coupling of the bifilar winding. This opposite voltage produces a current flow through the internal recovery diodes 222 and 224 associated with MOSFETs 216 and 218, and into the link circuit. To ensure that this current flow does not cause large voltage spikes in the link circuit and an increased load on MOSFETs 216 and 218, base diode 240 produces a negative potential at base node 220 so that no current can flow from ground (GND) to Vcc. Base diode 240 thus causes a slowed shutoff of MOSFET 216, which latter is briefly held in the linear state even after reception of the shutoff signal. The result is to decrease the voltage spikes in the link circuit, and also the currents through recovery diodes 222 and 224 into the link circuit, upon shutoff of motor strands 212 and 214. The decrease in voltage spikes likewise limits loads on the power stage, electromagnetic compatibility is improved, and unpleasant motor noise is reduced.

Because of the high power level of ECM 120 that is possible according to the present invention and the very low-resistance configuration, in accordance with a preferred embodiment, of motor winding 212, 214 when ECM 120 is starting up and stalled, extremely large motor currents can nevertheless flow; these would represent a considerable load on MOSFETs 216 and 218 and on the power supply system for motor strands 212 and 214. This is where the current limiting system according to the present invention takes effect.

In accordance with an embodiment of the present invention, the actual motor current, i.e. the winding currents in motor strands 212 and 214, flows through base diode 240 and shunt resistor 250 to ground. Shunt resistor 250 and node 290 constitute current measuring element 170, and a voltage that is directly dependent on the motor current is picked off via shunt resistor 250 (i.e. at node 290). This voltage is used to determine the actual value of the motor current, which is delivered to the non-inverting input of operational amplifier 270 as motor current control variable I. As has already been described above, a freely selectable motor current limit value I_MAX is delivered from motor current limit value generator 160 to the inverting input of operational amplifier 270.

Operational amplifier 270 constitutes motor current setting element 180 and, in accordance with a preferred embodiment of the invention, is operated as a comparator. Operational amplifier 270 accordingly compares motor current control variable I, or a variable derived therefrom, with the predetermined motor current limit value I_MAX. If motor current control variable I exceeds the predetermined motor current limit value I_MAX, operational amplifier 270 influences commutation signals OUT_1 and OUT_2 with a control signal CTRL via diodes 232 and 234. This control signal causes MOSFETs 216 and 218 to be switched off, thereby achieving a limitation of the motor current. The load on MOSFETs 216 and 218 and on motor winding 212, 214 in the extreme operating states of startup and stalling is thus reduced according to the present invention.

In particular, in accordance with the circuit depicted in FIG. 2, it is possible to dispense with an electrolytic capacitor in the link circuit. In accordance with a preferred embodiment of the present invention, this allows control circuit 150 to be implemented on a fully SMD circuit board that can be completely populated using the reflow soldering process.

Figure 3:
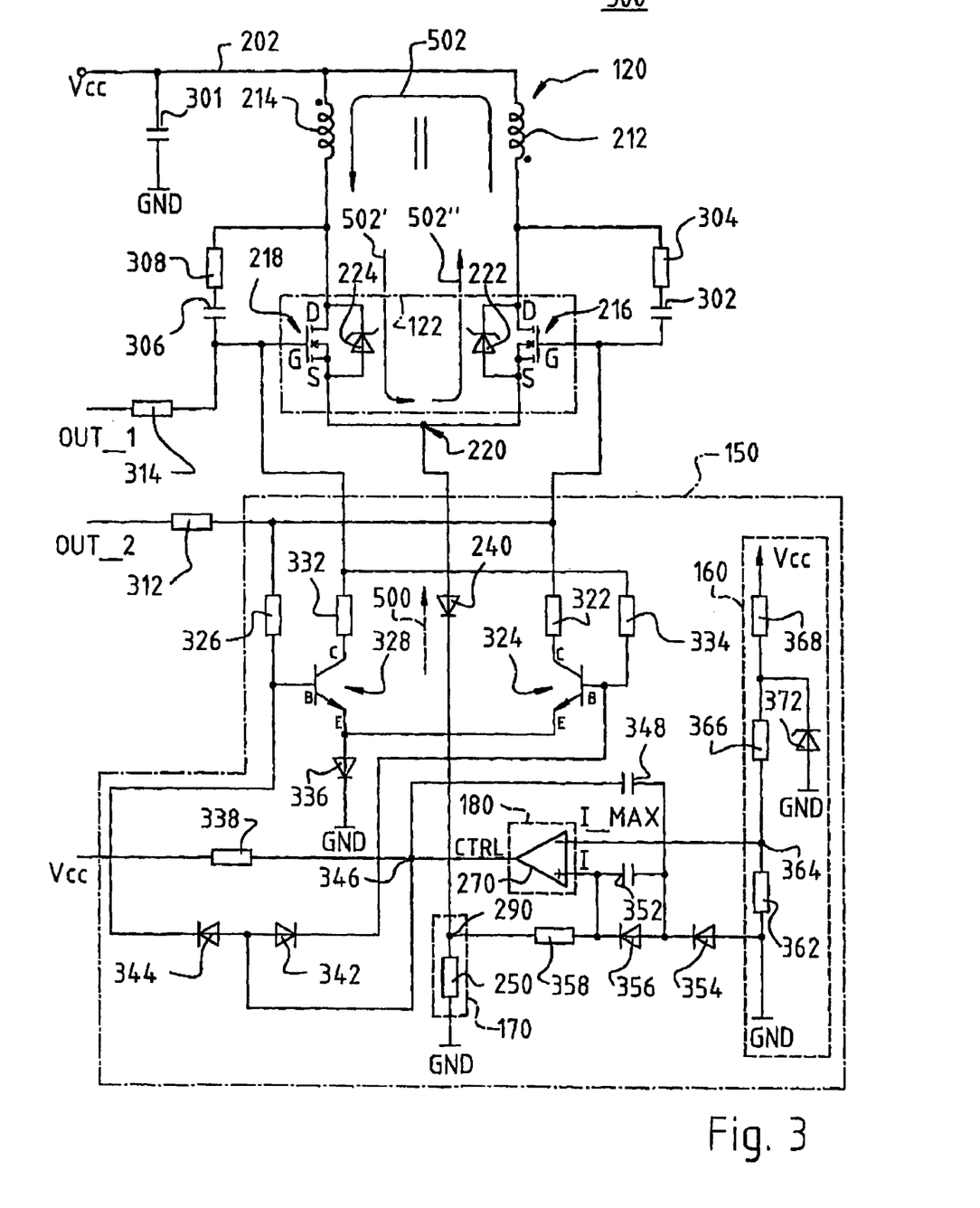
FIG. 3 is a simplified circuit diagram of an apparatus having a control circuit for current limitation for an ECM, in accordance with an alternative embodiment of the invention.

FIG. 3 is a simplified circuit diagram of an exemplifying circuit 300 with which apparatus 100 for operating ECM 120 of FIG. 1 is implemented in accordance with a second embodiment. The exemplifying circuit 300 accordingly also encompasses a plurality of components that make up DC voltage source 110; ECM 120 having power stage 122 and having the at least one associated Hall sensor 140; controller 130 having commutation controller 132; and control circuit 150 having motor current limit value generator 160, current measuring element 170, and motor current setting element 180. Components used here that are identical, or function identically, to ones in FIG. 2 are labeled with the same reference characters and are not explained again.

In the exemplifying circuit 300, positive lead 202 between the Vcc terminal and motor strand 214 is connected to ground (GND) via a link circuit capacitor 301. The gate and drain regions of MOSFET 216 are connected to one another via a series circuit made up of a capacitor 302 and a resistor 304, and the gate and drain regions of MOSFET 218 are connected to one another via a series circuit made up of a capacitor 306 and a resistor 308. Commutation signal OUT_2 is delivered to the gate region of MOSFET 216 through a resistor 312, and commutation signal OUT_1 is delivered to the gate region of MOSFET 218 through a resistor 314.

In contrast to FIG. 2, however, the gate regions of MOSFETs 216 and 218 are not connected to diodes. Instead, the gate region of MOSFET 216 is connected on the one hand via a resistor 322 to the collector of an NPN bipolar transistor 324, and on the other hand via a resistor 326 to the base of an NPN bipolar transistor 328. Corresponding to this, the gate region of MOSFET 218 is connected on the one hand via a resistor 332 to the collector of NPN bipolar transistor 328, and on the other hand via a resistor 334 to the base of NPN bipolar transistor 324. The emitters of NPN bipolar transistors 324 and 328 are connected to the anode side of a diode 336 whose cathode side goes to ground. In addition, the base of NPN bipolar transistor 324 is connected to the cathode side of a diode 342, and the base of NPN bipolar transistor 328 is connected to the cathode side of a diode 344. The anode sides of diodes 342 and 344 are connected via a node 346 to the output of operational amplifier 270, to a resistor 338, and to one side of a capacitor 348. Pull-up resistor 338 is connected to Vcc. The other side of capacitor 348 is connected to one side of a capacitor 352, to the cathode side of a diode 354, and to the anode side of a diode 356. The other side of capacitor 352 is connected on the one hand to the non-inverting input of operational amplifier 270. On the other hand, the other side of capacitor 352 is connected to the cathode side of diode 356. The other side of capacitor 352 is moreover connected via a resistor 358 to node 290. The anode side of diode 354 is connected on the one hand to ground, and on the other hand to one terminal of a resistor 362. The other terminal of resistor 362 is connected via a node 364 on the one hand to the inverting terminal of operational amplifier 270 and on the other hand, via a series circuit of two resistors 366 and 368, to positive pole Vcc. Connected between the two resistors 366 and 368 is the cathode side of a Zener diode 372, whose anode side goes to ground.

During operation of the exemplifying circuit 300, capacitors 302 and 306 constitute R/C elements with resistors 304 and 308 respectively connected in series therewith. These R/C elements are configured to flatten out steep switching edges of shutoff signals, i.e. commutation signals OUT_1 and OUT_2 for shutting off motor strands 212 and 214. These R/C elements thus contribute to slowing the shutoff of MOSFETs 216 and 218. As a result, in the exemplifying circuit 300 it is possible to use in the link circuit, for example instead of an electrolytic capacitor, a ceramic capacitor 301 in the 100-nF range. In particular, ceramic capacitor 301 can be implemented using an SMD ceramic capacitor, in order to enable implementation of control circuit 150 on a fully SMD circuit board that is to be completely populated using the reflow soldering process. In addition, because of the slowed shutoff of MOSFETs 216 and 218, electromagnetic compatibility is further improved and corresponding motor noise or solid-borne sound is additionally reduced.

In accordance with a preferred embodiment, in the exemplifying circuit 300 commutation signals OUT_1 and OUT_2 can be pulled to ground with NPN bipolar transistors 324 and 328. For this, NPN bipolar transistors 324 and 328 can be made conductive by way of a corresponding control signal CTRL from operational amplifier 270. This control signal CTRL is delivered to the base of each NPN bipolar transistor 324 and 328 through a diode matrix formed by diodes 342 and 344. The fact that NPN bipolar transistors 324 and 324 are made conductive causes commutation signals OUT_1 and OUT_2 to be pulled to ground. Commutation signals OUT_1 and OUT_2 can be pulled to ground in ON-OFF fashion, in which context the switching can be performed with a frequency of approximately 1 kHz. The frequency of approximately 1 kHz for ON-OFF switching is advantageous for thermal reasons. A different frequency may optionally also be advantageous in order to reduce noise that occurs as a result of the switching. The fact that commutation signals OUT_1 and OUT_2 are pulled to ground causes MOSFETs 216 and 218 to be blocked, which in turn produces a limitation of the winding currents in motor strands 212 and 214.

For the case in which a power stage switch 216, 218 is conductive, diode 336, which is arranged between transistors 324, 328 and ground GND, compensates for the potential difference with respect to the potential at the anode of base diode 240 by the fact that the voltage drop at diode 336 is similar to or the same as at diode 240. Diode 336 furthermore prevents current from flowing back into the circuit in the event of mispolarity.

To generate control signal CTRL, operational amplifier 270 compares motor current control variable I, which is delivered from node 290 through resistor 358 to the non-inverting input of operational amplifier 270, with motor current limit value I_MAX. Motor current limit value I_MAX is delivered by motor current limit value generator 160, which is implemented using resistors 362, 366, and 368 and Zener diode 372.

The principle will be explained again with reference to FIG. 3. Recovery current 502, 502', 502" is plotted for the case in which transistor 216 is non-conductive and the potential at the gate terminal of transistor 218 is pulled to ground GND by current limiting control circuit 150. In this case recovery current 502, 502', 502" flows through the recovery circuit made up of the (still conductive) transistor 218, the non-conductive transistor 216 having recovery diode 222, and winding strands 212 and 214. Because of the transformer coupling of winding strands 212, 214, an activated current limiting control circuit 150 causes the potential at the one winding to drop when the potential at the other winding rises, and vice versa. In this state the source terminals of both transistors 216, 218 follow the negative potential of the drain terminal of the already non-conductive transistor 216. The potential of the drain terminal of transistor 218, on the other hand, rises to 2*Vcc, or twice the operating voltage. Base diode 240 prevents a current 500 from flowing back into the link circuit, so that a link circuit superelevation, i.e. an elevation in the operating voltage or voltage Vcc, cannot occur. Only a small link circuit capacitor (electrolytic capacitor) is therefore necessary, or a link circuit capacitor can be completely dispensed with. Because the potential at node 220 can (and in this state in fact does) become negative as a result of base diode 240, the activation of current limiting control circuit 150 does not immediately produce a shutoff of transistor 218. Base diode 240 causes the energy to be completely dissipated in winding strands 212, 214 and in power stage 122.

The energy in winding strands 212, 214 and in power stage 122 is dissipated In the same fashion when transistor 218 is non-conductive and current limiting control circuit 150 becomes activated.

Figure 4:
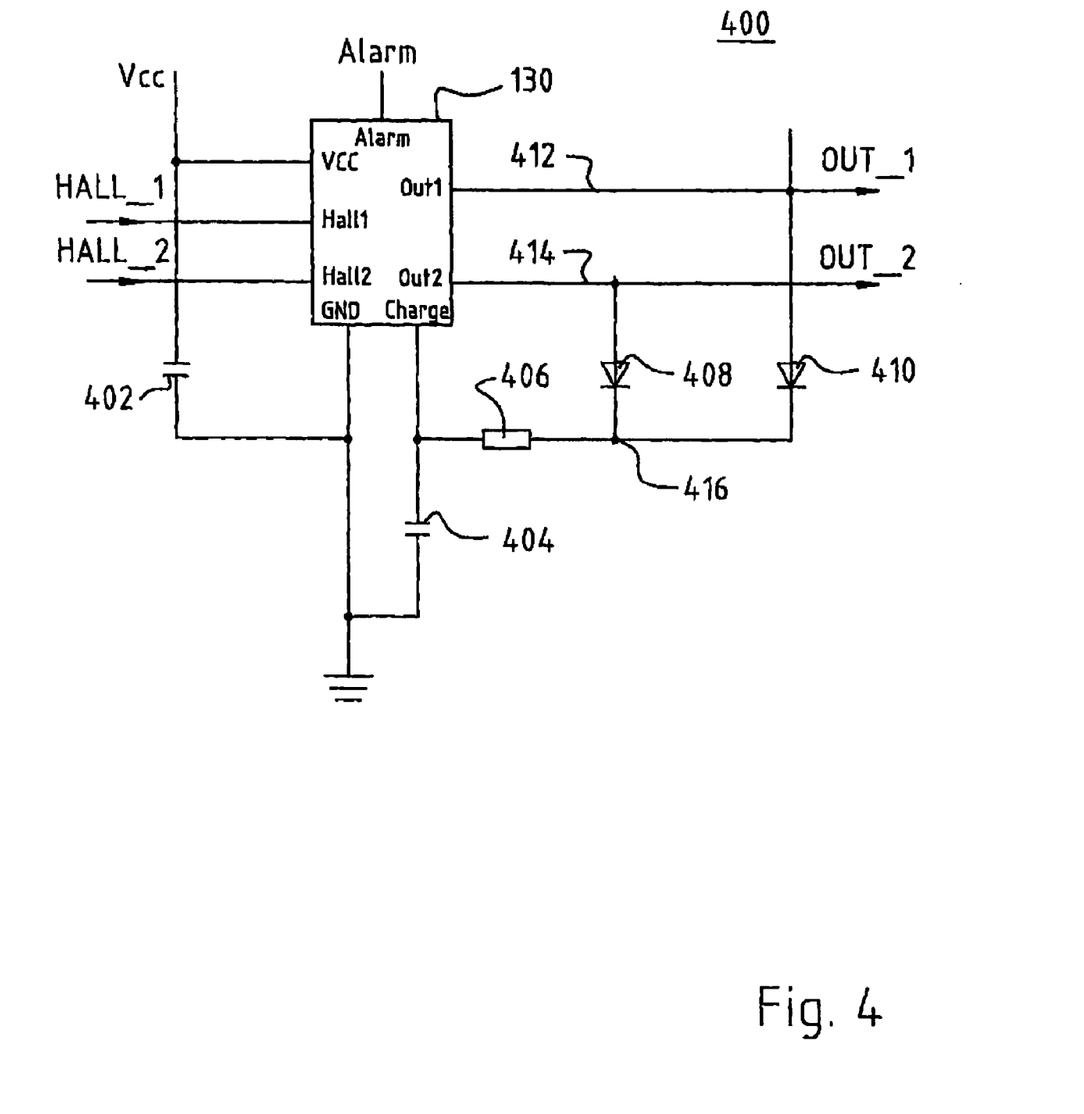
FIG. 4 is a simplified circuit diagram of a control system in accordance with an embodiment of the invention.

FIG. 4 is a simplified circuit diagram of an exemplifying circuit 200 with which a layout of controller 130 for commutating ECM 120 of FIG. 1 is implemented according to an embodiment of the present invention. In the exemplifying circuit 400, controller 130 is implemented illustratively using a commutation IC. Commutation IC 130 has Hall signals HALL_1 and HALL_2 delivered to it as input signals at corresponding inputs "Hall1" and "Hall2," as well as supply voltage Vcc at a corresponding "VCC" input. The "VCC" input is furthermore connected on the one hand to ground via a capacitor 402 and on the other hand to a ground input "GND" of commutation IC 130. Also provided on commutation IC 130 is a "Charge" input that is likewise connected to ground via a capacitor 404. On the output side, commutation IC 130 comprises "Alarm," "Out1," and "Out2" outputs at which signals Alarm, OUT_1, and OUT_2 are made available. Illustratively, signal OUT_1 can be picked off via a lead 412 that is likewise connected to the anode side of a diode 410. Signal OUT_2 can be picked off via a lead 414 that is connected to the anode side of a diode 408. The cathode sides of diodes 408 and 410 are connected to a node 416. Node 416 is additionally connected via a resistor 406 to the "Charge" input of commutation IC 130 and to capacitor 404.

When the exemplifying circuit 400 is in operation, power is supplied to commutation IC 130 with supply voltage Vcc. Commutation IC 130 generates, on the basis of Hall signals HALL_1 and HALL_2, the commutation signals OUT_1 and OUT_2 as well as the alarm signal Alarm.

Numerous variants and modifications are of course possible within the scope of the present invention.

What is claimed is:

1. A control circuit for an electronically commutated motor (120) having a power stage (122), which power stage has at least two semiconductor switches for influencing the motor current, which semiconductor switches are controllable by commutation signals (CTRL), which control circuit further comprises:
    a current measuring element (170) for making available a motor current control variable (I) dependent on the motor current;
    a diode (240) that is arranged in series with the current measuring element, and between the current measuring element and the at least two semiconductor switches; and
    a motor current setting element (180) with which the commutation signals can be influenced as a function of the motor current control variable, said motor current setting element being configured to influence the commutation signals whenever a motor current control variable exceeds a predetermined motor current limit value (I_MAX).

2. The control circuit according to claim 1, further comprising a motor current limit value generator (160) for specifying a changeable motor current limit value.

3. The control circuit according to claim 1, wherein the motor current setting element comprises
    a comparator (270) which is configured to compare the motor current control variable, or a variable derived therefrom, with said predetermined motor current limit value (I_MAX).

4. The control circuit according to claim 1, wherein the motor current setting element is configured to pull the commutation signals (OUT_1, OUT_2) to ground potential in the context of a motor current control variable exceeding a predetermined motor current limit value.

5. The control circuit according to claim 4, wherein the commutation signals are pulled to ground in ON-OFF fashion.

6. The control circuit according to claim 5, wherein the ON-OFF switching is accomplished at a frequency of approx. 1 kHz.

7. The control circuit according to claim 1, wherein said diode (240) is connected in a configuration which prevents a current flow from the current measuring element to the at least two semiconductor switches.

8. The control circuit according to claim 1, wherein the at least two semiconductor switches are implemented as field-effect transistors (216, 218), each respective source terminal being connected to said diode (240), and each drain terminal being connected to a pertinent stator winding (212, 214) of the electronically commutated motor.

9. The control circuit according to claim 8, wherein an R/C element (302, 304, 306, 308) is provided between the gate terminal and the drain terminal of each of the at least two field effect transistors (FET), in order to reduce the switching speed.

10. A control circuit for an electronically commutated motor (120) having
    a power stage (122), which power stage has at least two semiconductor switches for influencing the motor current, which semiconductor switches are controllable by commutation signals (CTRL),
    which control circuit further comprises:
    a current measuring element (170) for making available a motor current control variable (I) dependent on the motor current;
    a diode (240) that is arranged in series with the current measuring element, and between the current measuring element and the at least two semiconductor switches;
    a motor current setting element (180) with which the commutation signals can be influenced as a function of the motor current control variable (I); and
    wherein
    the commutation signals are connectable to ground (GND) through at least one bipolar transistor (324, 328).

11. The control circuit according to claim 10, wherein a diode (336) is provided between the at least one bipolar transistor (324, 328) and ground (GND).

12. The control circuit according to claim 10, wherein the motor current setting element makes the at least one bipolar transistor conductive in order to influence the commutation signals.

13. The control circuit according to claim 10, which comprises at least two bipolar transistors that are connected to the motor current setting element via a diode matrix (342, 344).

14. A control circuit for an electronically commutated motor (120) having a power stage (122), which power stage comprises at least two semiconductor switches for influencing the motor current, which semiconductor switches are controllable by commutation signals (CTRL), which control circuit comprises:
    a current measuring element (170) for making available a motor current control variable (I) dependent on the motor current;
    a diode (240) that is arranged in series with the current measuring element, and between the current measuring element and the at least two semiconductor switches;
    a motor current setting element (180) with which the commutation signals can be influenced as a function of the motor current control variable, wherein
    the current measuring element (170) comprises a resistor (250).

15. The control circuit according to claim 1, wherein the electronically commutated motor comprises at least two stator windings (212, 214) which are coupled in a transformer configuration.

16. The control circuit according to claim 1, wherein
the control circuit is configured to keep a semiconductor switch (216, 218), after receipt of a commutation shutoff signal, temporarily in a conductive state to release electrical energy present in a stator winding, thereby permitting implementation of a DC link circuit using a relatively compact ceramic capacitor (301) instead of a bulkier electrolytic capacitor which would otherwise be required to store said electrical energy.

17. A control circuit for an electronically commutated motor (120) having a power stage (122), which power stage has at least two semiconductor switches for influencing the motor current, which semiconductor switches are controllable by commutation signals (CTRL),
which control circuit further comprises:
a current measuring element (170) for making available a motor current control variable (I) dependent on the motor current;
a diode (240) that is arranged in series with the current measuring element, and between the current measuring element and the at least two semiconductor switches;
a motor current setting element (180) with which the commutation signals can be influenced as a function of the motor current control variable; and wherein
a ceramic capacitor (301) is provided in a DC link circuit.

18. The control circuit according to claim 17, wherein the ceramic capacitor is an SMD ceramic capacitor.

19. A control circuit for an electronically commutated motor (120) having a power stage (122), which power stage has at least two semiconductor switches for influencing the motor current, which semiconductor switches are controllable by commutation signals (CTRL),
said control circuit further comprising:
a current measuring element (170) for making available a motor current control variable (I) dependent on the motor current;
a diode (240) that is arranged in series with the current measuring element, and between the current measuring element and the at least two semiconductor switches;
a motor current setting element (180) with which the commutation signals can be influenced as a function of the motor current control variable (I); and
a stall protection circuit (262) that sets the commutation signals to ground potential in the context of a motor stall.

20. The control circuit according to claim 19,
which further comprises
a rotor position sensor arrangement (140) for generating a rotor position signal, and wherein
the stall protection circuit (262) ascertains, from said rotor position signal, whether the motor is stalled.

21. The control circuit according to claim 1, wherein
at least one recovery diode (222, 224) is connected in parallel with each of the at least two semiconductor switches (216, 218).

22. A control circuit for an electronically commutated motor (120) having a power stage (122), which power stage has at least two semiconductor switches for influencing the motor current, which semiconductor switches are controllable by commutation signals (CTRL),
said control circuit further comprising:
a current measuring element (170) for making available a motor current control variable (I) dependent on the motor current;
a diode (240) that is arranged in series with the current measuring element, and between the current measuring element and the at least two semiconductor switches;
a motor current setting element (180) with which the commutation signals can be influenced as a function of the motor current control variable; and
a fully SMD (Surface Mounted Device) circuit board on which all the electrical components, except for the connector leads, are configured as SMD components.

23. The control circuit according to claim 22, wherein
each of said SMD components is electrically connected with other circuit components by a solidified solder connection.

* * * * *